Patented Dec. 1, 1942

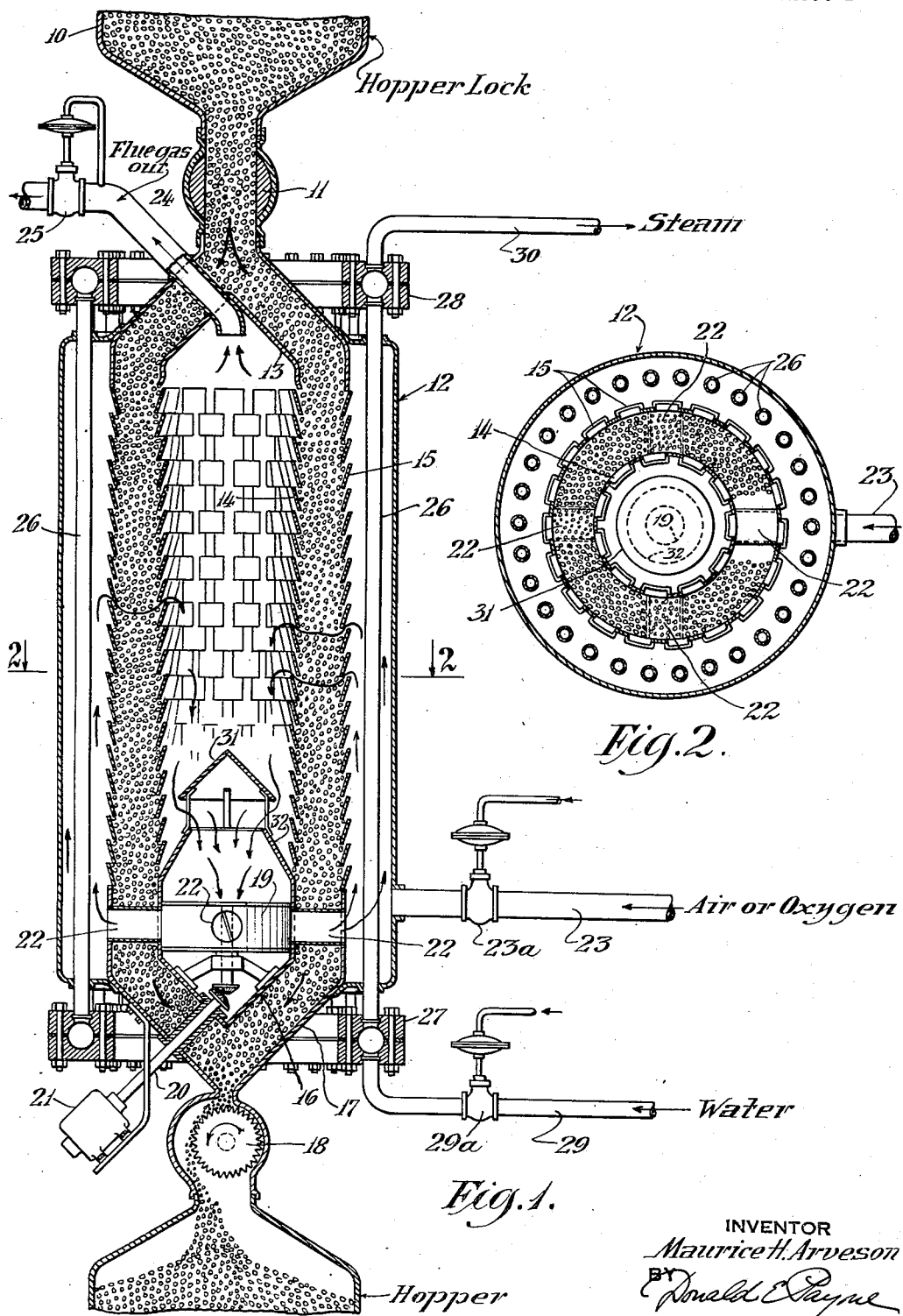

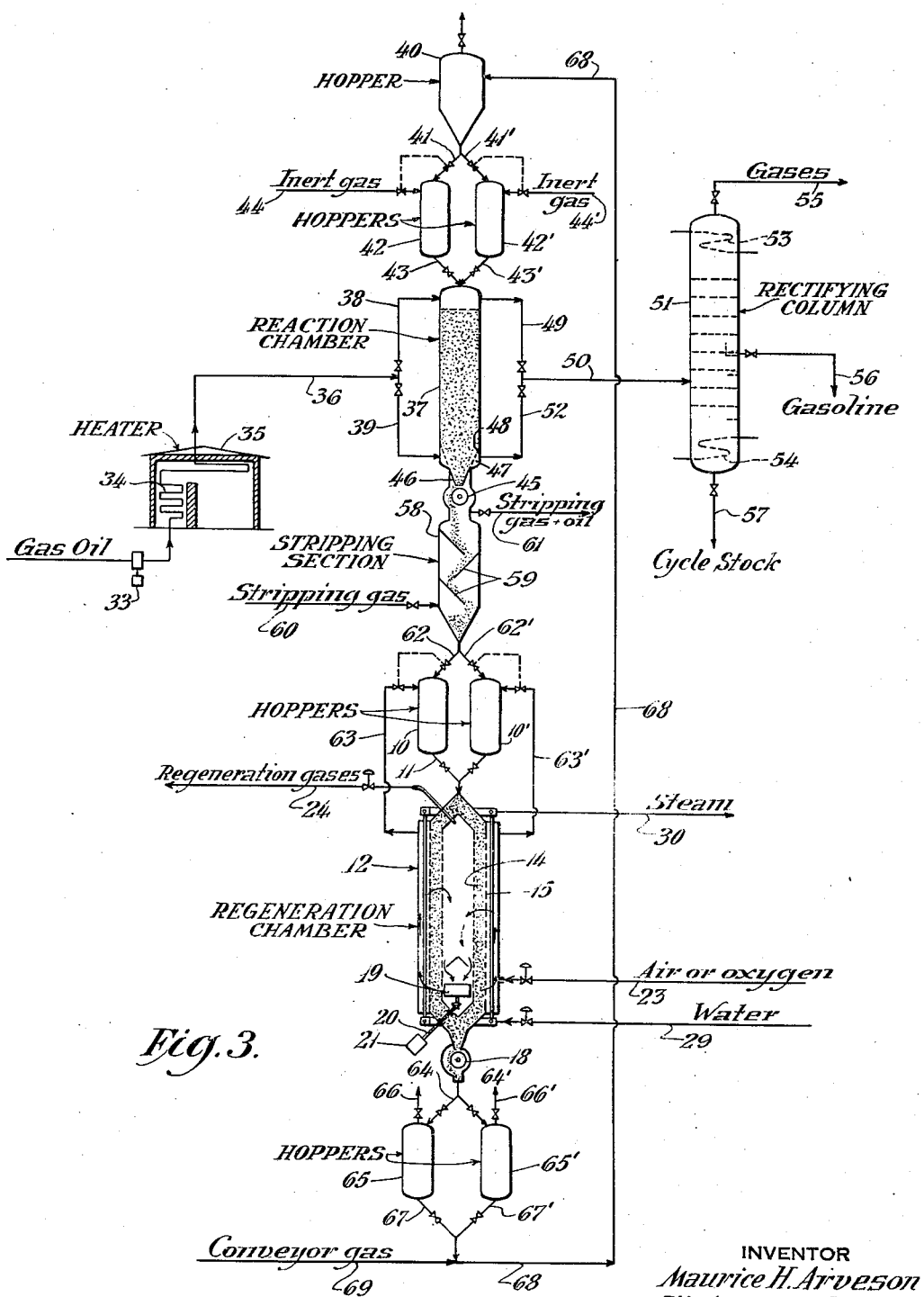

2,303,717

UNITED STATES PATENT OFFICE 2,303,717

REGENERATION OF CONTACT MATERIAL

Maurice H. Arveson, Flossmoor, Ill., assignor to Standard Oil Company, Chicago, Ill., a corporation of Indiana Application December 15, 1939, Serial No. 309,448

12 Claims. (Cl. 196—52)

This invention relates to an improved oil refining system of the type wherein oil is treated with a solid contact material for effecting decolorizing, desulfurizing, cracking, reforming, isomerizing, cyclicizing, aromatizing, polymerizing, etc. and wherein the contact material is subsequently revivified or regenerated by the modification or removal of carbonaceous material which has deposited thereon. It pertains more specifically to an improved method and means for regenerating spent contact material under closely controlled temperature conditions.

When mineral oils are percolated through bleaching earths or activated clay they absorb resins, polymers, asphaltic materials, etc. and eventually become spent because of this deposit of carbonaceous materials. Similarly, when activated clays or a synthetic solid catalyst are employed in processes of catalytic cracking, reforming, desulfurizing, aromatizing, etc. the catalyst material becomes deactivated or spent because of the deposition thereon of carbonaceous material. Heretofore it has been the practice to regenerate or to revivify such spent contact material by controlled oxidation in Wedge-type or Nichols-Herreshoff furnaces, rotary kilns or chambers provided with heat exchange tubes imbedded in the body of contact mass which is undergoing regeneration. An object of my invention is to provide a simple and relatively inexpensive system for continuously regenerating contact material in which the regeneration temperature can be closely controlled and in which regeneration can be effected more completely and more efficiently than in any system or process heretofore used. A further object is to increase the effectiveness and life of contact material by subjecting it to my improved regeneration process. A further object is to provide an improved method and means for regenerating contact material under superatmospheric pressure and for obtaining a rapid, uniform and more complete regeneration without danger of hot spots and without exceeding narrowly defined temperature limits.

A further object of the invention is to provide an improved system for continuously refining oil with solid contact material and continuously regenerating spent contact material for reuse. A further object is to provide improved means for regulating the flow of contact materials into and out of contacting zones without incurring any leakage of gases or vapors into or out of said zones.

A further object is to provide an improved method and means for passing large volumes of oxygen-containing gases through contact material at substantially constant temperature without the necessity of employing expensive flue gas generators and insulated external pumping, piping and heat control means. A further object is to avoid the imbedding of heat exchange tubes in bodies of contact mass and to provide improved methods and means for dissipating the heat generated by the oxidation of carbonaceous materials from the contact masses. Other objects will become apparent as the detailed description of the invention proceeds.

I have found that the best way to remove undesirable carbonaceous deposits from contact masses without exceeding critically narrow temperature limits is to blow a sufficiently large amount of inert gas thru the contact mass to pick up and carry away substantially all of the heat liberated by the controlled oxidation. It is essential that the contact mass be in relatively thin beds in order that the heat picked up in one portion of the bed is not imparted to other parts of the bed. By surrounding each particle of contact mass with a rapidly moving stream of gases the temperature control may be much more closely regulated than by imbedding heat exchange tubes in a body of catalyst material (because of the extreme low heat conductivity of such material). External flue gas recirculation has been used for regulating temperatures in such regeneration processes but is objectionable not only because of the enormous capital and investment costs for larger blowers, larger lines, larger valves, etc., but because of the difficulty of maintaining adequate temperature control, particularly at high regeneration rates.

In accordance with my invention the spent catalyst material is continuously passed through a regeneration zone in the form of a relatively thin bed through which regeneration gases are rapidly and continuously recirculated. Sufficient oxygen is added as air to the recirculated gases to maintain the desired combustion, and regeneration gases are continuously withdrawn from the system. An outstanding feature of this regeneration process is the continuous recycling of large quantities of gases within the regeneration chamber itself so that all parts of the chamber are maintained within closely defined temperature limits. The temperature of the recycled gases may be controlled by suitable heat exchange coils outside the body of the catalyst material itself and the liberated heat of regneration may be utilized for any desired purpose.

A preferred embodiment of my invention contemplates the use of a relatively small regeneration chamber containing two cylindrical louvered walls between which the contact material gradually descends in a thin, moving annular bed. A blower continuously and rapidly recycles gases from the space within the inner wall of said inner bed to the space surrounding the outer wall thereof (or vice versa) so that there is a continuous and fairly rapid flow of gases through the thin moving annular bed as the contact material descends from the top to the bottom thereof. Oxygen or air is continuously introduced into the recycled gases to support the combustion of carbonaceous material and spent flue gas is continuously withdrawn at a sufficient rate to maintain the desired pressure. The temperature of the recycled gases is controlled by heat exchange coils which in no way interfere with catalyst flow but which effectively remove excess heat from the recycled gases before they are again passed through the thin moving bed of contact material.

Other features of the invention include improved means for regulating the flow of solid contact material in moving bed systems. In order to prevent gas leakage into or out of a treating or regenerating chamber I employ multiple hoppers so that the hopper which is discharging into the chamber is sealed from the atmosphere while the hopper being filled is sealed from the chamber. To this multiple hopper system I have added a provision for supplying a pressuring gas to the hopper which is discharging material into the chamber.

For controlling the flow of solid materials from the base of a reaction or regenerating chamber I prefer to employ a rotating catalyst dispenser which will insure the discharge of the desired amounts of catalyst with minimum abrasion or shearing of the catalyst particles. These and many other features of the invention will be more clearly understood as the following detailed description proceeds.

In the accompanying drawings which form a part of this specification and in which similar parts are designated by like reference characters:

Figure 1 is a vertical cross section through a preferred type of regeneration chamber;

Figure 2 is a horizontal section taken along the line 2—2 of Figure 1; and

Figure 3 is a flow diagram schematically showing the regeneration system as employed in an oil-refining process which incorporates other features of the invention.

The invention is applicable to the revivification or regeneration of spent solid contact material from a wide variety of treating processes. The contact material may be spent filter clay from the percolation or contacting of lubricating oils. It may be spent polymerization catalyst such as phosphoric acid deposited on kieselguhr, alumina-silica catalyst, synthetic or natural, etc., which has been used for the polymerization of normally gaseous hydrocarbons into motor fuel or other heavier hydrocarbons. It may be a spent cracking catalyst of either the activated natural clay type or the synthetic type; acid-treated bentonite such as Super Filtrol is a preferred example of the natural type while the synthetic type is preferably a metal oxide deposited on active silica, silica gel containing about 10% to 40% of alumina deposited thereon being a preferred example. It may be a spent dehydrogenation, aromatization or reforming catalyst in which an oxide of a IV, V or VI group metal is deposited on activated alumina, alumina gel, bauxite, etc., a preferred example of which is about 4% to 6% of molybdenum oxide impregnated or adsorbed on activated alumina. In fact the invention is applicable to the revivification or regeneration of any solid contact material which has been employed in a petroleum refining process and become spent because of the deposition thereon of carbonaceous materials.

A preferred embodiment of my improved regeneration system is shown in Figures 1 and 2. Spent contact material from any of the enumerated sources is introduced from hopper 10 by plug valve 11 into regeneration chamber 12. This chamber is preferably a simple cylindrical vessel containing means for exposing the contact material in a relatively thin moving bed to the action of recycled gases as the material flows from the top to the bottom of the chamber. In Figure 1 I have shown a conical distributing member 13, the base of which terminates at the top of a cylindrical louvered wall 14. Spaced from this louvered wall at a distance of about 3 to 24 inches is a second cylindrical louvered wall 15. These louvered walls are of very simple construction and may be made by simply stamping out louvers on relatively thin metal sheets and then forming the sheets into cylindrical form. Instead of louvered walls of this type I may employ foraminous walls of any type, such as screens or reticulated means for retaining catalyst material while permitting the lateral flow of gases through the walls. The louver or Venetian blind type of wall is greatly preferred because it causes minimum catalyst abrasion or attrition.

Inner louvered wall 14 extends downwardly to a bottom wall 16 which is spaced from hopper spaced bottom wall 17 of the chamber. Outer louvered wall 15 preferably extends from the top of the chamber to the bottom thereof. The contact material is deflected by the inverted conical wall 13 to the annular space between louvered walls 14 and 15 and it slowly moves to the bottom of the chamber in a thin annular bed which is withdrawn through the space between walls 16 and 17 and finally discharged from the chamber at a rate which is controlled by rotating member 18.

It will be noted that the regeneration chamber is thus divided by the annular bed of spent contact material into an inner zone within and bounded by walls 13, 14 and 16, a catalyst zone, and an outer zone bounded by wall 15 and the outer wall of chamber 12. At one or more points in this inner zone I provide a blower or fan 19 which is driven by shaft 20 and motor 21. This blower or fan takes suction on gases and vapors in the inner zone and discharges them through ports 22 to the outer zone, ports 22 consisting preferably of relatively large conduits extending through the catalyst bed and connecting the discharge side of the fan to the zone surrounding louvered wall 15. In operation this blower or fan 19 (and a number of such blowers or fans may be employed in large installations) continuously recirculates the gases from the inner to the outer zone and causes said gases continuously to pass from the outer zone through louvered wall 15 and the descending bed of contact material back through louvered wall 14 to the inner zone. The fan or blower may be mounted outside of the chamber, but closer control and other advantages are obtained by mounting the fan inside the chamber.

In order to burn carbonaceous matter from the contact mass, air or oxygen is introduced through line 23 at a rate controlled by controller valve 23a preferably at the suction side of the blower, although it may be introduced at any point in the system. This air or oxygen becomes intimately admixed with hot recirculated gases and as it is rapidly passed through the descending bed of contact material it effects combustion and the removal of objectionable carbonaceous deposits. The excess combustion products and flue gases are withdrawn from the system through line 24 in amounts controlled by pressure regulated valve 25.

In order to maintain the recycled gases within closely defined temperature limits a plurality of heat exchange tubes 26 are positioned in the space surrounding louvered wall 15, these heat exchange tubes preferably being connected to suitable headers 27 and 28. Water, steam, fused salts or other heat exchange medium may be introduced to header 27 by line 29, (the rate of introduction being controlled by valve or pump 29a), and discharged from header 28 by line 30. The hot gases from the inner zone are thus cooled by contact with tubes 26 before they again pass through the downwardly moving bed of contact material, and by this simple procedure the regeneration temperature may be controlled within very close limits.

The operation of the regeneration system will be described as applied to the regeneration of a spent cracking catalyst which may contain about 1% to 10% or more (dependent on the nature of the catalyst and the conditions under which it has been used) of carbonaceous material deposited thereon. This catalyst is preferably introduced from hopper 10 at a temperature of about 600° to 800° F. and the heat exchange fluid introduced through line 29 is regulated in amount (by valve or pump 29a) and temperature to maintain the circulated gases in the system at an average temperature (leaving catalyst bed) of about 850° to 1050° F., preferably about 950° F. Five to one hundred or more, preferably at least fifteen, volumes of gases are recirculated by fan 19 for each volume of air that is introduced. The amount of recycled gases should be as large as commercially feasible since the greater the amount of gas recirculation the more closely the temperature can be controlled. The rate of gas flow across the moving bed of contact material should not be so great, however, that the gases blow excessive quantities of catalyst material over the louvers. To catch any such catalyst and prevent excessive quantities from entering the suction end of the fan I provide baffles 31 and 32, the latter being a frusto-conical baffle with its lower outer edge feeding any deflected catalyst material back into the moving bed. The bed thickness is preferably about 12 inches although it may vary through a considerable range. The pressure in the regeneration system is preferably about atmospheric to 100 pounds per square inch or higher, for example about 50 pounds per square inch, and this pressure is maintained by pressure-controlled valve 25 in regeneration gas discharge line 24. The catalyst holding time is preferably about ½ to 5 or 10 hours. As the catalyst slowly descends in its annular bed it is constantly at kindling temperature and there is always sufficient oxygen in the recirculated gases to maintain combustion. However, the oxygen content is so low and the volume of gases circulating is so large that hot spots are entirely avoided and the maximum variation of temperatures throughout the bed may be kept within limits of 25° to 50° F.

When the invention is applied to spent clay from the percolation or contacting of lubricating oils the regeneration temperature is preferably maintained at about 900° to 1200° F., preferably at about 1000° to 1050° F. The same temperatures, generally speaking, are employed for the regeneration of most spent contact materials, but it should be understood that any desired temperature may be maintained for any particular contacting material.

The apparatus and process hereinabove described may likewise be employed for the so-called carbonization of contact materials wherein clay or catalysts are subjected to lesser degrees of oxidation or to treatment with non-oxidizing gases. When my system is used for carbonization I may circulate a heating fluid through tubes 26 to maintain the temperature of the recycled gases at about 1000° to 1200° F. The recycled gases in this case are preferably flue gas, light hydrocarbons and/or hydrogen, although steam or other inert gases may also be used. Charcoal may be reactivated by this means.

Referring now to Figure 3, I will describe a catalytic cracking process embodying the above and other features of my invention. Gas oil or other suitable charging stock is introduced by pump 33 through coils 34 of pipe still 35 and thence through transfer line 36 either to the top of reaction chamber 37 through valved line 38 or to the bottom of chamber 37 through valved line 39, depending upon whether concurrent or countercurrent flow is desired. The catalyst material from hopper 40 is introduced through valved conduit 41 to hopper 42 while valved conduit 43 is closed. When hopper 42 is substantially filled the valve in conduit 41 is closed and the valve in 41' is open so that hopper 42' may be filled while valved conduit 43' is closed. In order to introduce catalyst from hopper 42' or 42 into conversion chamber 37 the valve 41' or 41 is closed, valve 43' or 43 is open and an inert pressuring gas is introduced through line 44' or 44. Thus in the drawing hopper 42 is being filled with catalyst with valves closed in lines 44 and 43, while hopper 42' is discharging catalyst to chamber 37 through line 43' with the valve in conduit 41' closed and the valve in conduit 44' open.

Chamber 37 is maintained substantially full of catalyst by means of rotating catalyst discharge means 45 rotatably mounted under hopper-shaped discharge 46. Discharge means 45 may consist of a recessed rotating plug valve but it is preferably a serrated cylinder rotatably mounted under element 46 and spaced therefrom at such a distance that when its rotation is stopped the flow of catalyst material is stopped. In other words, the serrated cylinder 45 is of such diameter and is mounted sufficiently close to the narrowed end of discharge element 46 that the catalyst assumes an angle of repose without freely flowing over the cylinder. When the cylinder is rotated it carries a thin layer of catalyst in the direction of its rotation, so that the discharge of catalyst from hopper 46 may be positively and closely controlled by simply regulating the speed of rotation of serrated cylinder 45. By serrated I mean sufficiently roughened so that the catalyst material will not slide freely thereon but will be held at a predetermined angle of repose. This is an important feature of the invention since it permits accurate regulation of catalyst flow without abrasion, shearing or undue wear on the catalyst particles themselves. The loss to catalyst fines must be held to a minimum and this rotating cylinder which may be mounted slightly off-center and which operates as hereinabove described offers a simple and effective method of regulating catalyst flow without degrading the catalyst to fines.

If the hot vaporized charging stock is introduced through line 39 it is preferably distributed in annular space 47 between the lower chamber wall and the upper portion of element 46, the latter containing slits or perforations 48 through which these vapors enter the moving catalyst bed. The temperature in this catalyst bed is maintained at about 775° to 1000° F., preferably about 850° to 925° F., the pressure is preferably atmospheric to about 50 pounds per square inch, the catalyst holding time (time required to pass 1 reactor volume of catalyst material therethrough) is about 0.1 to 5 hours and the space velocity of vapor flow is about 0.2 to 5, preferably about 1 volume of charging stock (liquid basis) per volume of catalyst space per hour. With countercurrent flow the reaction products are withdrawn through line 49 and line 50 to a suitable fractionation system diagrammatically represented as column 51. If concurrent flow is employed the reaction products will be withdrawn through line 52 and line 50 to fractionation system 51.

The fractionation system is diagrammatically illustrated as a rectifying column having reflux coils 53, a reboiler coil 54, an overhead line 55 for hydrocarbon vapors, an intermediate drawoff line 56 for gasoline and a bottom drawoff line 57 for heavier-than-gasoline materials commonly referred to as cycle stock. Actually, the fractionation system may include a preliminary separation of cycle stock from gasoline and lighter hydrocarbons followed by the stabilization in a separate tower of the gasoline and the recovery of light gasoline components from gases and overhead materials by means of an absorption system. The recovery system per se forms no part of the present invention and it will not be described in further detail.

The spent catalyst is discharged from rotating cylinder 45 into stripping section 58 which is preferably provided with inclined baffles 59 and with an inlet line 60 for a stripping gas which preferably consists of hot hydrocarbon gases, hot flue gas, etc., but which may consist of steam where the contact material is not deleteriously affected thereby. Any residual oil is removed from the solid contact material in this stripping section and is withdrawn therefrom through line 61 to any suitable recovery system or may be discharged with products from reaction chamber 37. The pressure in the stripping section is slightly higher than the pressure in reaction chamber 37 so that there will be a small leakage of stripping gas into the reaction chamber but no leakage of reaction vapors into the stripping section.

From the base of the stripping chamber 58 a spent and dried contact material is passed either through line 62 to hoper 10 or through line 62' to hopper 10'. While hopper 10' is being filled the valve in line 62 will be closed and the upper part of hoper 10 will be connected by line 63 to the vapor space in regeneration chamber 12 so that the contact material may flow through valve conduit 11 into the regeneration chamber. Alternately, valved lines 63, 11 and 62' are closed while valved lines 62, 63' and 11' are open. Instead of simply connecting hoppers 10 and 10' to the regeneration chamber to permit the flow of spent catalyst thereto I may employ a pressuring gas for this purpose, as hereinabove described in connection with hoppers 42 and 42'. Alternatively, hoppers 42 and 42', and also hoppers 10 and 10' may be arranged in series instead of in parallel.

The flow of the spent catalyst through the regeneration chamber 12 has already been fully described. The regenerated catalyst discharged by rotating valve or reticulated cylinder 18 is either passed by valved line 64 to hopper 65 or by valved line 64' to hoper 65', a suitable vent 66 and 66' being provided for the release of regeneration gases associated therewith. While hopper 65' is being filled the regenerated catalyst is withdrawn from hopper 65 through valved line 67 to conveyor system 68 which returns it to hopper 40 for reuse. Any suitable type of conveyor system may be used but I prefer to employ pneumatic conveying means. A suitable conveyor or gas (which may be hot regeneration or flue gas) may be introduced through line 69 for this purpose. Thus alternately valved lines 64 and 67' are closed while valved lines 64' and 67 are opened. After closing line 64' line 66' is opened to depressure vessel 65'; similarly in the case of vessel 65. All of the lines, hoppers, conveyor system, etc. are properly insulated in order that the catalyst material may be maintained at high temperature throughout its entire course.

While my invention has been described in connection with catalytic cracking it should be understood that it is equally applicable to other catalytic refining processes such as reforming, dehydrogenation, aromatization, cyclization, desulfurization, isomerization, polymerization, etc. When the regeneration system is employed for revivifying spent filter clay that has been employed for percolating or contacting lubricating oils certain modifications will be required in original treating chamber 37 due to the fact that the hydrocarbons are treated in liquid phase instead of in vapor phase. The oils to be treated may be diluted with light hydrocarbon diluents such as naphtha, butane, propane, etc. and they may be percolated or contacted with a catalyst at any conventional temperatures and pressures and the spent earth stripped. The regeneration of the spent contacting material may be effected in exactly the same manner as that hereinabove described and the diluent, if any, may be removed from the contacted oil by any conventional distillation system.

While I have described a preferred embodiment of my invention it should be understood that my invention is not limited to the specific details hereinabove set forth and that other modifications and equivalents will be apparent to those skilled in the art from the above description.

I claim:

1. The method of continuously regenerating spent contact material containing carbonaceous deposits thereon, which method comprises passing said contact material through a regeneration zone in a substantially vertical moving bed retained between perforated walls, continuously passing hot inert gases through said moving bed in a direction generally transverse to the movement of the contact material in said bed, adjusting the temperature of said gases prior to their passage through said bed and continuously recycling said gases from one side of said bed to the other at such a rate that the temperature of the contact material in the moving bed is maintained substantially uniform.

2. The method of claim 1 wherein the temperature rise across the contact bed does not exceed about 100° F.

3. The method of claim 1 wherein the temperature of said bed is maintained within the limits of about 900° to 1200° F.

4. The method of claim 1 which includes the further steps of introducing oxygen into the gases which are recycled from one side of the bed to the other and withdrawing regeneration gases from the system.

5. The method of claim 1 wherein the moving contact bed is about 3 inches to about 18 inches in thickness.

6. The method of effecting rapid regeneration of solid contact material which has become contaminated with carbonaceous deposits, which method comprises passing said contact material by gravity in a relatively thin moving bed through a regeneration zone, passing hot gases through said moving bed in a direction generally transverse to the flow of said bed, continuously recycling said gases from one side of said bed to the other side thereof, adjusting the temperature of said recycled gases to maintain a substantially uniform temperature in said moving bed, continuously introducing an active regeneration gas into the recycled gas stream and continuously withdrawing spent regeneration gas from the system.

7. The method of claim 6 which includes the step of maintaining the pressure of the recycled gases higher than atmospheric but not materially in excess of 100 pounds per square inch and maintaining the temperature of said gases within the range from about 900° to about 1100° F.

8. In a continuous hydrocarbon conversion system the method of catalytically converting hydrocarbons into gasoline which comprises vaporizing said hydrocarbons and contacting them with a solid catalyst whereby said catalyst becomes coated with carbonaceous material, stripping said coated catalyst material for removing occluded oil therefrom, passing said stripped catalyst material in a relatively thin, substantially vertical moving bed through a regeneration zone, passing hot gases through said moving catalyst bed generally transverse to the direction of said movement, recycling said gases from one side of said bed to the other, regulating the temperature of the recycled gases to maintain a substantially constant temperature in the catalyst bed, continuously introducing small amounts of oxygen into the recycled gases, withdrawing gases from the regeneration system and recycling the regenerated catalyst from the bottom of said moving bed for further use in said contact step.

9. The method of continuously regenerating spent contact material which has become contaminated with carbonaceous deposits, which method comprises maintaining a regeneration zone under super-atmospheric pressure, introducing spent contact material at the top of said zone and withdrawing contact material from the base of said zone while maintaining said zone under super-atmospheric pressure, passing said contact material through said zone in the form of a relatively thin moving bed, passing gases through said moving bed transverse to the movement of the bed, recycling said gases from one side of said bed to the other, adjusting the temperature of the recycled gases to maintain a substantially uniform temperature in the moving bed, introducing air into the recycled gases for burning carbonaceous matter from the contact material, withdrawing gases from the system in amounts necessary to maintain the desired super-atmospheric pressure, and recycling a volume of gases which is at least five times the amount of air introduced.

10. The method of claim 1 which includes the further steps of introducing air into the gases which are recycled from one side of the bed to the other, withdrawing regeneration gases from the system, and recycling about 15 to 100 volumes of inert regeneration gases for each volume of air introduced into the system.

11. The method of continuously regenerating spent contact material containing carbonaceous deposits thereon which method comprises continuously introducing said contact material into a regeneration zone and continuously withdrawing contact material therefrom at such rates as to maintain a moving bed of contact material in said regeneration zone, continuously introducing air into said zone and continuously removing regeneration gas therefrom, maintaining a heat exchange zone at the periphery of the regeneration zone, introducing a vaporizable liquid at the base of said heat exchange zone, withdrawing vapors from the top of said heat exchange zone and transferring heat from contact material in all parts of said zone to said heat exchange zone by circulating a heat transfer medium throughout said regeneration zone and contacting said medium with said heat exchange zone in the course of its circulation.

12. The method of claim 11 wherein the heat transfer medium comprises hot regeneration gases.

MAURICE H. ARVESON.